United States Patent
Panzer

[15] 3,666,705
[45] May 30, 1972

[54] PRODUCTION OF ALCOHOL-FREE VINYLAMIDINES

[72] Inventor: Hans Peter Panzer, Stamford, Conn.
[73] Assignee: American Cyanamid Company, Stamford, Conn.
[22] Filed: June 1, 1970
[21] Appl. No.: 42,468

[52] U.S. Cl. ........260/29.6 AN, 260/29.6 AB, 260/29.6 AQ, 260/33.4 R
[51] Int. Cl. .........................................C08f 45/24
[58] Field of Search..............260/33.4 R, 29.6 AN, 29.6 AQ, 260/29.6 AB

[56] References Cited

UNITED STATES PATENTS 3,406,139  10/1968  Hurwitz.................................260/29.6

OTHER PUBLICATIONS

Brandrup et al. (eds.), Polymer Handbook, Interscience Publishers, 1966.

*Primary Examiner*—Morris Liebman
*Assistant Examiner*—S. M. Person
*Attorney*—Evans Kahn

[57] ABSTRACT

A reaction mixture composed of an acrylonitrile polymer, a water-soluble alkylenepolyamine and a water-soluble alcohol on heating yields a solution of a poly-2-vinylimidazoline in the alcohol. The alcohol separates, usually as a supernatant layer, when the solution is acidified with an aqueous solution of a strong acid.

14 Claims, No Drawings

PRODUCTION OF ALCOHOL-FREE VINYLAMIDINES

The present invention relates to compositions of matter of special properties which on heating yield vinyl polymers substantially composed of $C_{2-3}$ alkylene vinylamidine linkages.

It is known that water-soluble polymers substantially composed of $C_{2-3}$ alkylene vinylamidine linkages can be prepared by reacting an acrylonitrile polymer with a water-soluble alkylenepolyamine having two nitrile-reactive basic amino groups. Taking polyacrylonitrile and ethylenediamine as examples, the process yields poly-2-vinylimidazoline:

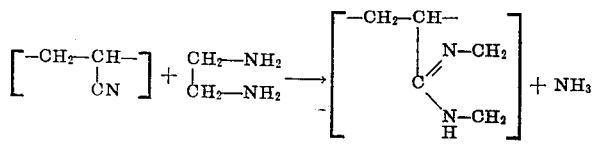

cf. British Pat. No. 1,010,058, and Hurwitz et al. U.S. Pat. No. 3,406,139. In similar manner, a poly-2-tetrahydropyrimidine is produced when the ethylenediamine is replaced by trimethylenediamine.

Because these polymers contain the

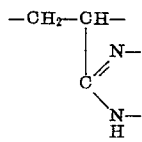

linkage they are hereinafter termed vinylamidine polymers, and when the unsatisfied valences of this linkage are connected with ethylene, propylene or trimethylene groups they are termed $C_{2-3}$ alkylene vinylamidine polymers.

The aforesaid reaction mixture becomes very viscous during the course of the reaction, and the presence of solvent is a practical necessity to keep the reaction mixture at a stirrable viscosity. Excess diamine has been used as the solvent (cf. Williams et al. copending application Ser. No. 821,949, filed May 5, 1969), but economics requires that this excess be recovered and reused. Unfortunately, the cost of recovering this excess is high, as a result of which the process has not been employed commercially.

The discovery has now been made that reaction mixtures which consist essentially of (A) an acrylonitrile polymer, (B) a water-soluble alkylenepolyamine having two nitrile-reactive basic amino groups in amount substantially stoichiometrically equivalent to the acrylonitrile linkages of said acrylonitrile polymer, and (C) a water-soluble saturated alcohol having a boiling point between about 75° and 200° C., the weight of the alcohol being at least twice the combined weight of the polyacrylonitrile and the alkylenepolyamine, possesses a number of important and beneficial properties which in preferred embodiments are as follows:

1. When heated, the composition reacts towards formation of the desired polymer without attainment of an unacceptably high viscosity.
2. The composition can be rapidly brought to a temperature at which the reaction proceeds rapidly, yet the heat evolved by the reaction can be safely controlled by reflux action of the solvent.
3. The composition is anhydrous before, during and after reaction, and presents no corrosion problem.
4. The solvent dissolves the product and is chemically inert and inexpensive. The crude reaction product therefore can be used for many purposes without elimination of the solvent.
5. The acrylonitrile polymer and the diamine interreact almost quantitatively to produce the desired vinylamidine polymer, and substantially no side reactions occur.
6. A most extraordinary property of the composition is that after the diamine has reacted with the acrylonitrile polymer, substantially all of the alcohol in the composition can be recovered merely by adding acid and allowing the mixture to stand. The alcohol separates, usually as a supernatant layer, substantially free from polymer and acid, but with part of the water added with the acid. The alcohol layer can be withdrawn and the water therein removed, leaving anhydrous alcohol which can be reused in the process.

The polyacrylonitriles referred to include polyacrylonitrile itself, and polymers which are preponderantly composed of acrylonitrile linkages, the remaining linkages being essentially inert in the alkylenepolyamine reaction, so that they act as diluent or spacing linkages. Linkages of the latter type include methyl methacrylate, styrene, vinyl acetate, ethyl acrylate, 2-vinyl pyridine, vinyl alcohol (formed by hydrolysis of vinyl acetate linkages), ethylene, chloroethylene, and quaternized hexahydropyrimidine (from polymerization of diallyl dimethyl ammonium chloride).

The alkylenepolyamines which are present in the composition are water-soluble. They contain two (and only two) nitrile-reactive amino substituents. These substituents are either primary or secondary amino groups. The groups are connected by alkylene chains containing two or three carbon atoms. The alkylenepolyamines include, therefore, ethylenediamine, propylenediamine

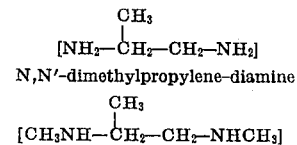

trimethylenediamine ($NH_2$—$CH_2$ $CH_2$ $CH_2$—$NH_2$), and N-(2-hydroxy)ethyl propylenediamine. Other amino groups may be present, but if so they should be tertiary or quaternary so as not to be nitrile-reactive.

The amount of alkylenepolyamine which is present in the composition of the present invention is approximately stoichiometrically equal to the number of nitrile substituents present, so that substantially all of the nitrile substituents are converted to imidazoline or tetrahydropyrimidine substituents with substantially complete consumption of the alkylenepolyamine. For this purpose, between about 0.8 and 1.2 equivalent (mol) of the alkylenepolyamine per nitrile group is suitable. When the mixture is heated sufficiently long, the reaction proceeds almost quantitatively. However, the composition reacts more rapidly when the alkylenepolyamine is present in small excess (10–20 percent by weight). This excess does not change the essential nature of the composition nor does it substantially decrease the need for alcohol solvent according to the present invention.

The alcohols present in the process of the present invention are critical. They are water-soluble (at least to the extent that they take up the water in the acid solution which is added at the end of the process). They are saturated, and are therefore chemically inert in the process. Their boiling points lie in the critical range of 75°–200°C. In this range lie on the one hand the temperatures at which the polyacrylonitrile reacts with the diamine sufficiently fast for practical purpose, and on the other hand the temperatures at which the reaction proceeds with maximum practical velocity and with evolution of heat at an acceptable fast but safe rate. It is a feature of the invention that by selection of an alcohol which has a boiling point within this range (and preferably in the range of 100°–150°C.) the reaction can automatically be conducted at an efficient yet safe temperature by conducting the reaction under reflux at about the boiling point of the alcohol.

Among the alcohols which can be used are ethyl alcohol (b.p. 78°C.), isopropyl alcohol (b.p. 82°C.), propanol (b.p. 97°C.), n-butanol (b.p. 117°C.), carbinol (amyl alcohol, b.p. 138°C.), 2-methoxyethanol (b.p. 124°C.), 2-ethoxyethanol (cellosolve, b.p. 135°C.), and ethylene glycol (b.p. 197°C.). Any other alcohol can be used which is water-soluble and saturated and which has a boiling point within the range mentioned.

The amount of the alcohol is likewise critical. It should be at least twice the weight of the combined weight of the polyacrylonitrile and the alkylenepolyamine, otherwise the reaction mixture reaches too high a viscosity and temperature control by reflux (where desired) is difficult. There does not appear to be any limit on the amount of alcohol which may be present, but we prefer that the weight of the alcohol be 2.5 to 3 times the combined weight of the polyacrylonitrile and the alkylenepolyamine. In this range the amount of alcohol is sufficient to provide a sufficiently low viscosity and reflux, and the problem of recovering of the alcohol is minimized.

The reason why the alcohol separates when the aqueous acid solution is added is not known and Applicant does not wish to be limited by any theory.

The reaction mixture may contain materials other than the foregoing so long as they do not alter the essential properties of the composition. Thus, the mixture may contain a catalyst for the reaction (e.g. sulfur), an inert solvent for the catalyst, and a dye or pigment to provide the product with an identifying color.

The composition is advantageously utilized in a jacketed reaction vessel provided with stirrer. While it is possible to control the exothermic reaction by circulation of cold water through the jacket and use of a high-boiling alcohol as the solvent, it is generally simpler to provide the vessel with a reflux column and to control the temperature by reflux of the solvent. The reaction proceeds smoothly yet sufficiently rapidly in the range of 100°–150°C. and this range is, therefore, preferred.

The acrylonitrile polymer is preferably added in crushed or coarsely ground state. The reaction mixture is a fluid slurry, but as the heating proceeds it changes to a viscous cloudy, curd-like mass which in the absence of solvent is a virtual solid. As the heating continues the cloudiness disappears and the mixture becomes a clear solution of pumpable viscosity. Termination of the reaction occurs when evolution of ammonia from the reaction mixture substantially ceases.

The step of recovering the alcohol in the product mixture is performed by stirring a strong acid and water into the mixture, allowing the mixture to stand, and then separating the alcohol which usually appears as a supernatant layer. The amount of acid which is added should be enough to convert the polymer substantially completely into salt form. It appears preferable to add the acid in slight excess so as to produce an acid pH.

The amount of water which should be added varies from instance to instance depending principally upon the number of vinylimidazoline or vinyltetrahydropyrimidine linkages in the polymer, the particular alcohol present and the particular acid used, and should be at least sufficient to dissolve the polymer salt. The optimum amount of water is that which (after the polymer has been formed into the acid salt) causes the maximum amount of alcohol to separate, and this can be found by laboratory trial. So far, a very satisfactory amount of water has been provided when the polymer salt has been formed by addition of acid of a normality between 2 and 8 (corresponding to strengths between about 10 and 30 percent acid by weight.

Among the strong acids, trichloroacetic, hydrochloric, nitric acids are suitable. However, better separation of the alcohol appears to occur when the acid used is a poly-basic acid, for example sulfuric, phosphoric and benzenedisulfonic acids. Additional strong acids suitable for use are disclosed in U.S. Pat. No. 3,288,707.

The products of the present invention are useful as pigment retention aids in the manufacture of paper, and as flocculants for the solids in sewage. They are specially useful as catalysts for accelerating the rate at which stearic anhydride develops its sizing action on paper; cf. Kulick et al., U.S. Pat. No. 3,445,330.

The invention is further described by the examples which follow. These examples represent preferred embodiments of the invention and are not to be construed as limitations thereon.

EXAMPLE 1

The following illustrates the reaction of a composition according to the present invention to form a polymer substantially composed of ethylene vinylamidine (2-vinylimidazoline) linkages.

Into a 3-liter glass flask provided with a heavy duty stirrer, reflux condenser and thermometer are charged first 100 g. of dry polyacrylonitrile ground to 100 percent-100 mesh, then 124.6 g. (1.2 mol equivalent) of 98.8 percent ethylenediamine premixed with 1.2 g. of precipitated sulfur powder as catalyst, and last 500 g. of anhydrous 2-ethoxyethanol (ethyl cellosolve) as reflux medium and solvent. The mixture is heated to 100°–110°C. over 75 minutes with stirring. A strong exotherm develops, and the mixture refluxes and becomes very viscous. It swells and then passes through a soft cheese-like stage and finally becomes a clear solution. After the exotherm moderates, the mixture is maintained at 105°C. until evolution of ammonia ceases (3 hours or less) and is then allowed to cool to room temperature. There is then added with stirring sufficient 6 N $H_2SO_4$ to render the mixture slightly acid (pH 5.1). The temperature rises to about 60° C. Upon standing, a supernatant layer weighing 486 g. separates, which consists of about 5 percent water, 94 percent solvent, and less than 1 percent solids (polymer), equivalent to 92.5 percent recovery of the solvent. The supernatant layer is decanted leaving a semisolid phase essentially composed of poly-2-vinylimidazoline sulfate and water.

EXAMPLE 2

The procedure of example 1 is repeated except that the 2-ethoxyethanol is replaced by n-butanol. Results are substantially the same except that the supernatant layer is composed of about 14 percent water and 85 percent butanol, together with less than 1 percent (0.6 percent) by weight of polymer, representing a recovery of 96.7 percent of the butanol.

EXAMPLE 3

The following illustrates performance of the reaction mixture with isopropanol as the solvent and reflux medium and separation of the isopropanol by the action of phosphoric acid.

53 g. of dry powdered polyacrylonitrile, 66 g. of ethylenediamine, and 0.6 ml. of carbon disulfide dissolved in 25 ml. of isopropanol are mixed in apparatus similar to that of example 1. The mixture is stirred and heated at the reflux temperature of isopropanol (80°–85°C.). 160 ml. of additional isopropanol is added during the first 6 hours as needed to prevent an undue rise in the viscosity of the reaction mixture and to provide reflux. The reaction is maintained at 80°C. until evolution of ammonia ceases (approximately 40 hours), and is then cooled, the product is acidified to pH 5 with 6 N phosphoric acid, and allowed to stand. The isopropanol forms a supernatant layer and is drawn off.

EXAMPLE 4

The procedure of example 1 is repeated except that 28 percent aqueous hydrochloric acid is used in place of the sulfuric acid solution. Results are substantially the same.

EXAMPLE 5

The following illustrates a reaction mixture which contains trimethylenediamine as reagent and as solvent an alcohol which usually does not reflux in the process (ethylene glycol), and the conversion of the mixture to an aqueous solution of a salt of a polymer substantially composed of trimethylene vinylamidine (2-vinyltetrahydropyrimidine) linkages.

Into a reaction flask equipped according to example 1 is placed 100 g. of a 90:10 molar ratio acrylonitrile:methyl methacrylate copolymer in coarsely ground state, 153 g. (1.2 mol) of trimethylenediamine, 500 g. of 2-methoxyethanol and 1.5 g. of sulfur powder as catalyst. The mixture is stirred and heated to 120°C. with continued stirring until a clear solution forms and a further 2 hours at 150°C. to ensure completion of the reaction. The fluid mixture is then cooled and to this is added with stirring sufficient 3 N $H_2SO_4$ (1.2 mol equivalent) to decrease the pH of the solution to 4.5. The mixture is allowed to stand. A layer of ethylene glycol forms and is decanted.

EXAMPLE 6

The following illustrates the production of quaternary ammonium polymers by use of the process of the present invention.

The procedure of example 2 is repeated to the point at which the reaction mixture is cooled, except that proportions are increased so that the weight of the polymer product is 337 g. The solution is then evaporated to a weight of 1,285 g. to provide a 26.1 percent solution of the polymer in butanol. The solution is then heated to 70°C. and there is added dropwise over 140 minutes, 346 g. of dimethyl sulfate (3 mols per mol of imidazoline linkages), together with saturated KOH solution to maintain the pH of the solution between 8.5 and 9.5. The temperature of the mixture rises to 86°C. A total of 204 g. of KOH solution is added. The mixture is cooled. It is a very thick yellow semisolid. Sufficient dilute (5 percent) sulfuric acid is added to decrease the pH of the mixture to 5.0. A supernatant layer of butanol forms and the polymer layer becomes clear.

EXAMPLE 7

The following illustrates the process of the present invention applied to the separation of other water-soluble alcohols from a polyvinylamine.

To 100 g. of a 25 percent by weight anhydrous solution of poly-2-vinylpyridine in n-butanol is slowly added with stirring 5 cc. of water, followed by 6 N phosphoric acid added dropwise until the pH of the solution reaches 4.5. The butanol separates as a supernatant layer.

EXAMPLE 8

The procedure of example 7 is repeated except that polyethylenimine is employed in place of the poly-2-vinylpyridine. The same separation takes place.

I claim:
1. A process for the manufacture of water-soluble cationic polymers substantially composed of $C_{2-3}$ alkylene vinylamidine linkages, which consists essentially in: forming a substantially anhydrous reaction mixture of (A) an acrylonitrile polymer, (B) a water-soluble alkylenepolyamine having two nitrile-reactive basic amino groups, the amount of said alkylenepolyamine being substantially stoichiometrically equivalent to acrylonitrile linkages of said polymer, and (C) a water-soluble saturated alcohol having a boiling point between 75° and 200°C., the weight of said alcohol being at least twice the combined weight of said acrylonitrile polymer and said alkylenepolyamine; heating said mixture at a temperature between 75° and 200°C. until substantially all of said alkylenepolyamine has reacted thereby forming a substantially anhydrous solution in said alcohol of a water-soluble polymer substantially composed of $C_{2-3}$ alkylene vinylamidine linkages; and then adding to said solution sufficient of a strong acid to convert said latter polymer to salt form and sufficient water to cause at least two-thirds of said alcohol to separate.

2. A process according to claim 1 wherein said mixture is heated under reflux at about the boiling point of said alcohol.

3. A process according to claim 1 wherein the acid solution is a solution of a polybasic acid.

4. A process according to claim 1 wherein the acid solution is 2 N to 8 N sulfuric acid.

5. A process according to claim 1 wherein the acid solution is 2 N to 8 N phosphoric acid.

6. A process according to claim 1 wherein the amount of acid which is added converts the polymer into neutral salt form.

7. A process according to claim 1 wherein the acrylonitrile polymer is polyacrylonitrile.

8. A process according to claim 1 wherein the acrylonitrile polymer is a 90:10 molar ratio acrylonitrile:methyl methacrylate copolymer.

9. A process according to claim 1 wherein the acrylonitrile polymer is a 90:10 molar ratio acrylonitrile:styrene copolymer.

10. A process according to claim 1 wherein the alkylenepolyamine is ethylenediamine.

11. A process according to claim 1 wherein the alkylenepolyamine is trimethylenediamine.

12. A process according to claim 1 wherein the alcohol is n-butanol.

13. A process according to claim 1 wherein the alcohol is 2-ethoxyethanol.

14. A process according to claim 1 wherein the alcohol is ethylene glycol.

* * * * *

Case 21,580

UNITED STATES PATENT OFFICE
CERTIFICATE OF CORRECTION

Patent No. 3,666,705                    Dated   May 30, 1972

Inventor(s)   Hans Peter Panzer

It is certified that error appears in the above-identified patent and that said Letters Patent are hereby corrected as shown below:

Title page under the References Cite, "Hurwitz" should read
-- Hurwitz et al. --. Column 1 in the first formula

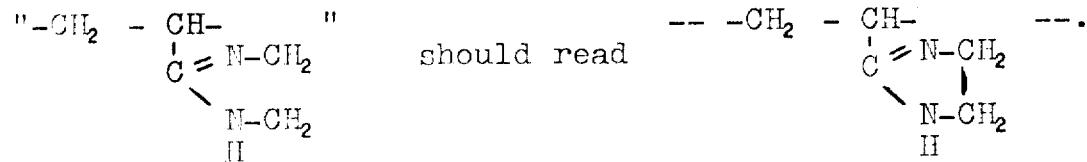

Signed and sealed this 5th day of September 1972.

(SEAL)
Attest:

EDWARD M. FLETCHER, JR.                ROBERT GOTTSCHALK
Attesting Officer                      Commissioner of Patents